United States Patent
Pauer

(10) Patent No.: US 7,061,233 B2
(45) Date of Patent: Jun. 13, 2006

(54) MAGNETICALLY PASSIVE POSITION SENSOR, METHOD FOR MANUFACTURING THE MAGNETICALLY PASSIVE POSITION SENSOR

(75) Inventor: Bernd Pauer, Eppstein (DE)

(73) Assignee: Siemens Aktiengesellschaft, Munich (DE)

( * ) Notice: Subject to any disclaimer, the term of this patent is extended or adjusted under 35 U.S.C. 154(b) by 185 days.

(21) Appl. No.: 10/771,908

(22) Filed: Feb. 3, 2004

(65) Prior Publication Data

US 2004/0169508 A1    Sep. 2, 2004

(30) Foreign Application Priority Data

Feb. 28, 2003    (DE) ................. 103 08 958

(51) Int. Cl.
*G01B 7/14*    (2006.01)
(52) U.S. Cl. ................ 324/207.24; 73/290 R; 33/708
(58) Field of Classification Search ........... 324/207.11, 324/207.12, 207.2, 207.21, 207.25, 207.24, 324/207.26; 33/708; 338/32 R, 32 H; 73/290 R
See application file for complete search history.

(56) References Cited

U.S. PATENT DOCUMENTS 5,032,790 A * 7/1991 Johnson ................. 324/174
5,798,640 A * 8/1998 Gier et al. ............ 324/207.24

FOREIGN PATENT DOCUMENTS

| DE | 32 16353 C2 | 4/1986 |
| DE | 43 09 442 C2 | 9/1996 |
| DE | 196 48 539 A1 | 6/1998 |
| DE | 100 23 654 A1 | 11/2001 |
| DE | 101 19 317 A1 | 10/2002 |
| JP | 2001291613 A | 10/2001 |

\* cited by examiner

*Primary Examiner*—Jay Patidar
*Assistant Examiner*—Tyrone Jackson
(74) *Attorney, Agent, or Firm*—Richard A. Speer; Mayer, Brown, Rowe & Maw LLP

(57) ABSTRACT

In a magnetically passive position sensor, a mechanical axis (11) and a magnetic axis (12) of a magnet (2) point toward the same contact spring element from two or more contact spring elements (5, 6). This results, in particular, in the end regions of the position sensor achieving a particularly high accuracy. The magnet (2) has a guide polygon (8) which is used to hold the magnet (2) in a holder (10) such that it cannot rotate.

5 Claims, 2 Drawing Sheets

Figure 1:
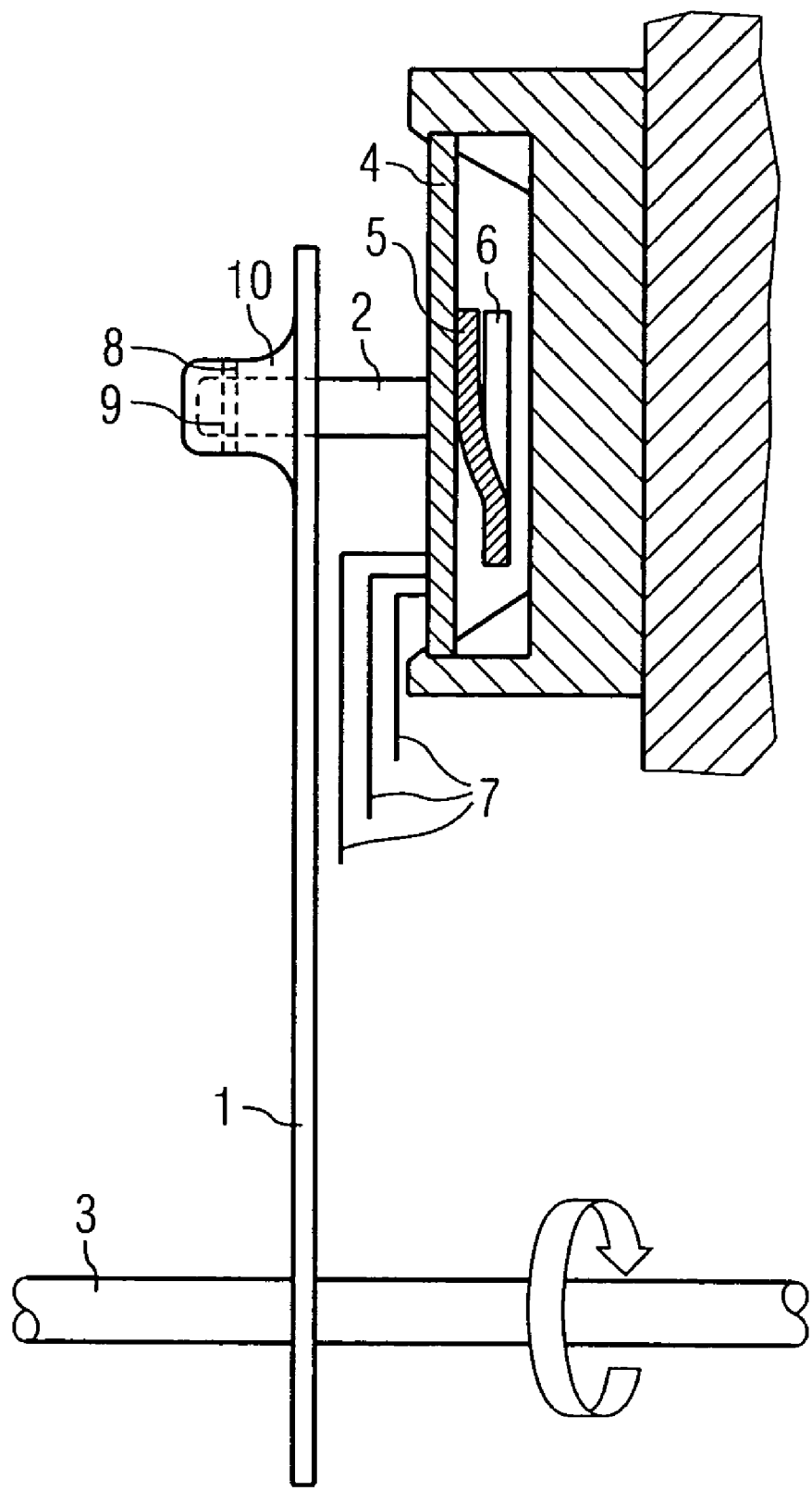

MAGNETICALLY PASSIVE POSITION SENSOR, METHOD FOR MANUFACTURING THE MAGNETICALLY PASSIVE POSITION SENSOR

The invention relates to a magnetically passive position sensor having a magnet arranged on a pivoting arm and having a large number of contact spring elements arranged in the pivoting range of the magnet, the contact spring elements lying opposite a thick film mesh, and it being possible for the contact spring elements to be moved by the magnet toward the thick film mesh. Furthermore, the invention relates to a method for producing a magnetically passive position sensor in which a magnet is arranged such that it can pivot over contact spring elements lying opposite a thick film mesh.

Magnetically passive position sensors are in common usage with level sensors in fuel tanks of modern motor vehicles and are known from DE 196 48 539 A1. The magnet is cylindrical and is held in a hole in the pivoting arm. One end side of the magnet lies opposite at least one of the contact spring elements. When the pivoting arm and thus the magnet are moved over the contact spring elements, contact spring elements, which differ in accordance with the location of the magnet, are pressed against the thick film mesh. This makes it possible to establish the position of the magnet.

One disadvantage of the known position sensor is the fact that the position of the magnet cannot be determined sufficiently well at the end points of its pivoting range. When the magnetically passive position sensor is used as a level sensor in fuel tanks, this results in inaccuracies precisely when the fuel tank is almost empty and a particularly high accuracy is required.

The invention is based on the problem of designing a magnetically passive position sensor of the type mentioned initially such that it has a particularly high accuracy close to the end points of the pivoting range. Furthermore, a method is to be provided for producing a position senor having a particularly high accuracy.

The first problem is solved according to the invention by the magnet being held such that it cannot rotate about its mechanical axis, which points toward the thick film mesh and which corresponds to the axis of symmetry, and by it being arranged with its magnetic axis pointing in an intended direction.

This design prevents the magnetic axis from swaying about the mechanical axis of the magnet. The magnetic axis of the magnet thus produces, at any time, a defined pivoting range over the contact spring elements. If the magnetic axis of the magnet deviates from its mechanical axis, its alignment, which cannot be rotated, ensures that, for example in the end regions, in each case the same contact spring elements are moved toward the thick film mesh. This eliminates any inaccuracies which are produced by a displacement of the magnetic axis from the mechanical axis of the magnet and by the rotation of the magnet around the mechanical axis.

In accordance with another advantageous development of the invention, a particularly low outlay is required to install the magnet in the intended position if the magnet has a guide polygon and if the pivoting arm is designed so as to correspond to the guide polygon. The guide polygon may in this case optionally be a recess or a projection.

The position sensor according to the invention has particularly high accuracy in its end regions if at least one of the contact spring elements is arranged on a connection between a magnetic axis and a mechanical axis of the magnet. In the event of the magnetic axis deviating from the mechanical axis of the magnet, the two axes are aligned with the same contact spring element. In addition, the magnetic axis points toward the next contact element and is thus capable of inducing a particularly high magnetic field strength in the relevant contact spring element.

The second-named problem, namely the provision of a method for producing a magnetically passive position sensor having a particularly high accuracy, is solved according to the invention by a magnetic axis of the magnet being determined, and by the magnetic axis of the magnet being aligned with that contact spring element which is the least remote.

This design ensures that the magnetic axis of the magnet is aligned with respect to the contact spring elements such that, in particular in the end regions of the pivoting range, the contact spring elements provided are moved toward the thick film mesh. Thanks to the invention, a further adjustment of the position sensor is not required. In the case of elongate magnets, the determination and alignment of the magnet according to the invention take place such that, firstly, a magnetic axis of the magnet is determined with respect to its mechanical axis, and then the magnet is aligned with respect to the next one of the contact spring elements such that both the magnetic axis and the mechanical axis point toward a common contact spring element.

In accordance with an advantageous development of the invention, the magnets can be prepared with a low outlay on installation in the pivoting arm if a guide polygon is incorporated in the magnets once the alignment of the magnetic axis has been determined. The magnets can then be inserted easily into a correspondingly designed holder of the pivoting arm.

Figure 2:
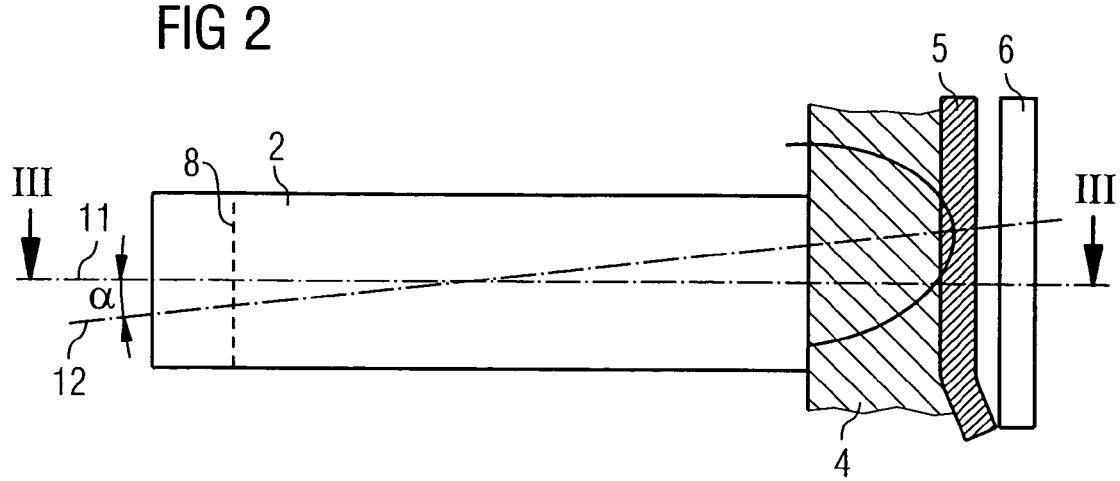
Figure 3:
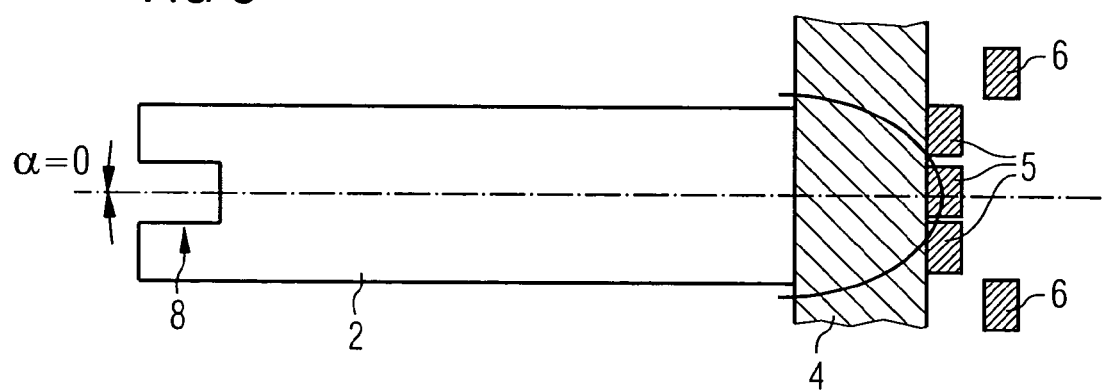

The invention may have numerous embodiments. To further explain its basic principle, one of these embodiments is illustrated in the drawing and described below. In the drawing:

FIG. 1 shows a sectional illustration through a position sensor according to the invention, FIG. 2 shows a greatly enlarged illustration of the position sensor from FIG. 1 in the region of a magnet, and FIG. 3 shows a sectional illustration through the position sensor from FIG. 2 along the line III—III.

FIG. 1 shows a position sensor having a magnet 2 arranged on a pivoting arm 1. The pivoting arm 1 is fixed to an axis of rotation 3. The axis of rotation 3 can be connected, for example, to a float (not illustrated) of a level sensor in a fuel tank of a motor vehicle. The magnet 2 can be pivoted over a thick film mesh 4. Magnetic contact spring elements 5, 6 are arranged on the side of the thick film mesh 4 which is remote from the magnet 2. The contact spring elements 5, 6 can be attracted by the magnet 2 and pressed toward the thick film mesh 4. The thick film mesh 4 is connected, via electrical lines 7, to an electronic unit (not illustrated) which detects the location of the magnet 2 via the contact spring elements 5, 6 resting on the thick film mesh 4. This position sensor is described in detail in DE 196 48 539 A1, for which reason reference is expressly made to this document regarding the possible description of the design and the function.

The magnet 2 has a guide polygon 8 which is arranged in the end side remote from the thick film mesh 4 and by means of which the magnet 2 is inserted into a correspondingly designed projection 9 of a holder 10 of the pivoting arm 1. The magnet 2 is thus fixed in the holder 10 of the pivoting arm 1 such that it cannot rotate. The guide polygon 8 is in the form of a groove here. In another embodiment (not illustrated), the guide polygon 8 may also be a rectangular outer cross section which is inserted into a rectangular holder 10 of the pivoting arm 1.

FIG. 2 shows, greatly enlarged, the magnet 2 having adjacent regions of the thick film mesh 4 and of the contact spring elements 5, 6 from FIG. 1. The magnet 2 has a mechanical axis 11 and a magnetic axis 12 which deviates from the mechanical axis 11 by the angle α. The angle a is established during manufacture and can only be reduced in size with considerable outlay when reworking the magnet 2.

FIG. 3 shows, in a sectional illustration along line III—III through the magnet 2 and the adjacent regions of the thick film mesh 4 and the contact spring elements 5, 6 from FIG. 2, that, from the view illustrated, the deviation of the magnetic axis 12 from the mechanical axis 11 is 0°. The magnet 2 is thus aligned such that the mechanical axis 11 and the magnetic axis 12 lie one on top of the other in the view illustrated in FIG. 3. The magnetic axis 12 and the mechanical axis 11 thus each point to the same contact spring element 5 resting against the thick film mesh 4.

In order to manufacture the position sensor from FIG. 1, firstly the magnet 2 is rotated about its mechanical axis 11 until the deviation of the magnetic axis 12 from the mechanical axis 11 is 0°, and then the guide polygon 8 in the form of a groove is incorporated into an end side of the magnet 2. When the magnet 2 is inserted into the holder 10 of the pivoting arm 1, the guide polygon 8 enters the projection 9. The magnet 2 is thus aligned in the position sensor.

The invention claimed is:

1. A magnetically passive position sensor comprising:
   (a) a plurality of magnetically operable electrical contact spring elements aligned between end points:
   (b) a thick film mesh lying opposite the contact spring elements;
   (c) a pivoting arm fixed to an axis of rotation and having an end remote from the axis of rotation for moving an operating magnet past the contact spring elements;
   (d) a magnet for operating the electrical contact spring elements, wherein the magnet has a longitudinal axis about which the magnet is mechanically symmetrical and a magnetic axis which deviates from the mechanical axis by an angle
   (e) a magnet holder on the remote end of the pivoting arm holding the magnet in a fixed position in which both axis point to the same contact spring element and there is no angle of deviation between the mechanical and magnetic axis when viewed from above.

2. The position sensor as claimed in claim 1, characterized in that the magnet has a guide polygon, and in that the pivoting arm is designed so as to correspond to the guide polygon.

3. The position sensor as claimed in claim 1 or 2, characterized in that at least one of the contact spring elements is arranged on a connection between a magnetic axis and a mechanical axis of the magnet.

4. A method for manufacturing a magnetically passive position sensor in which a magnet is arranged such that it can pivot over contact spring elements aligned between end points, the method determining the magnetic axis of the magnet, and aligning the magnetic axis of the magnet with that contact spring element located substantially midway of the end points.

5. The method as claimed in claim 4, including the step of incorporating a guide polygon in the magnet after the alignment of the magnetic axis has been determined.

* * * * *